Sept. 9, 1952 H. R. GOTTHARDT 2,609,917
POWER DRIVEN ROLLER CONVEYER
Filed Sept. 20, 1950 2 SHEETS—SHEET 1
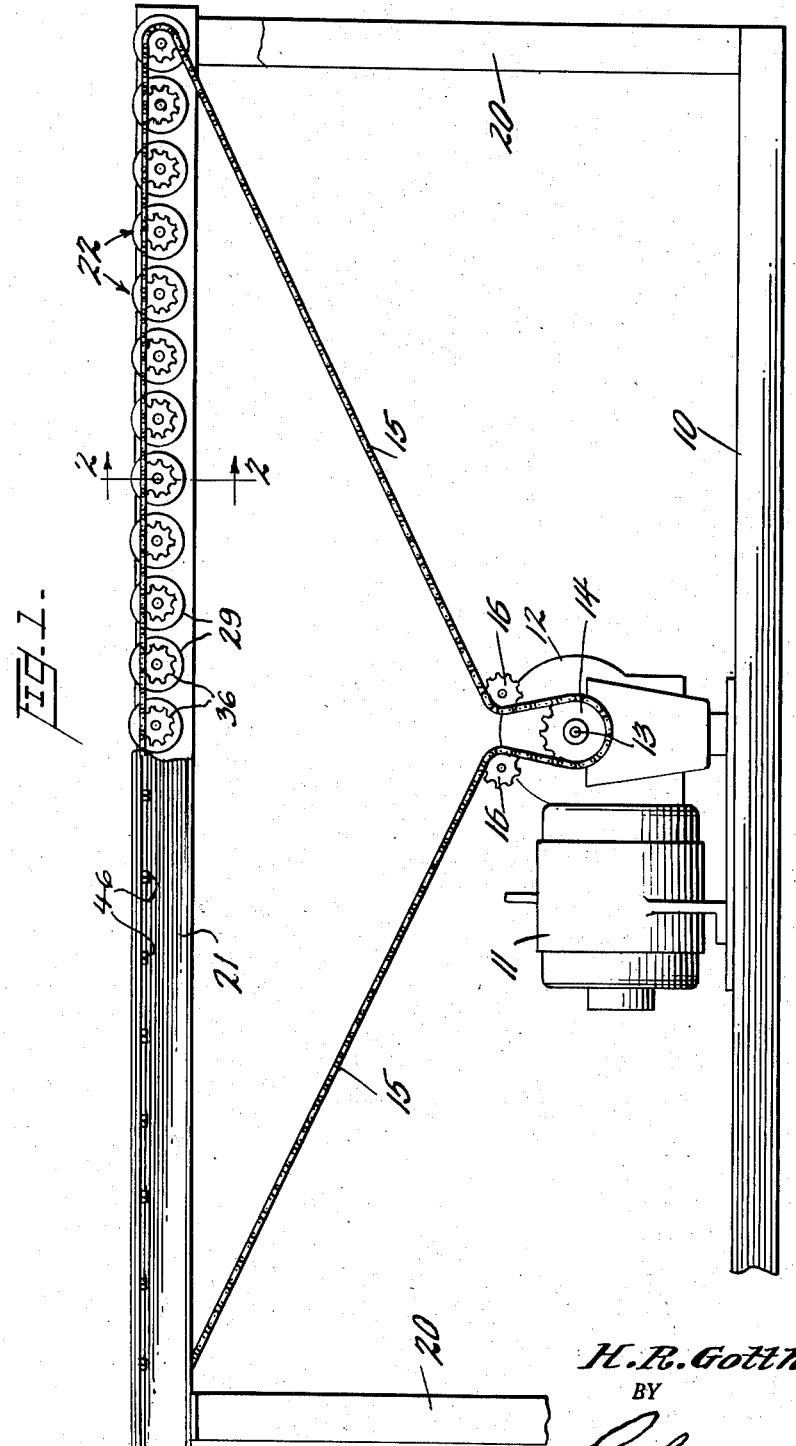
INVENTOR.
H. R. Gotthardt
BY
Parker and Welch
Attorneys

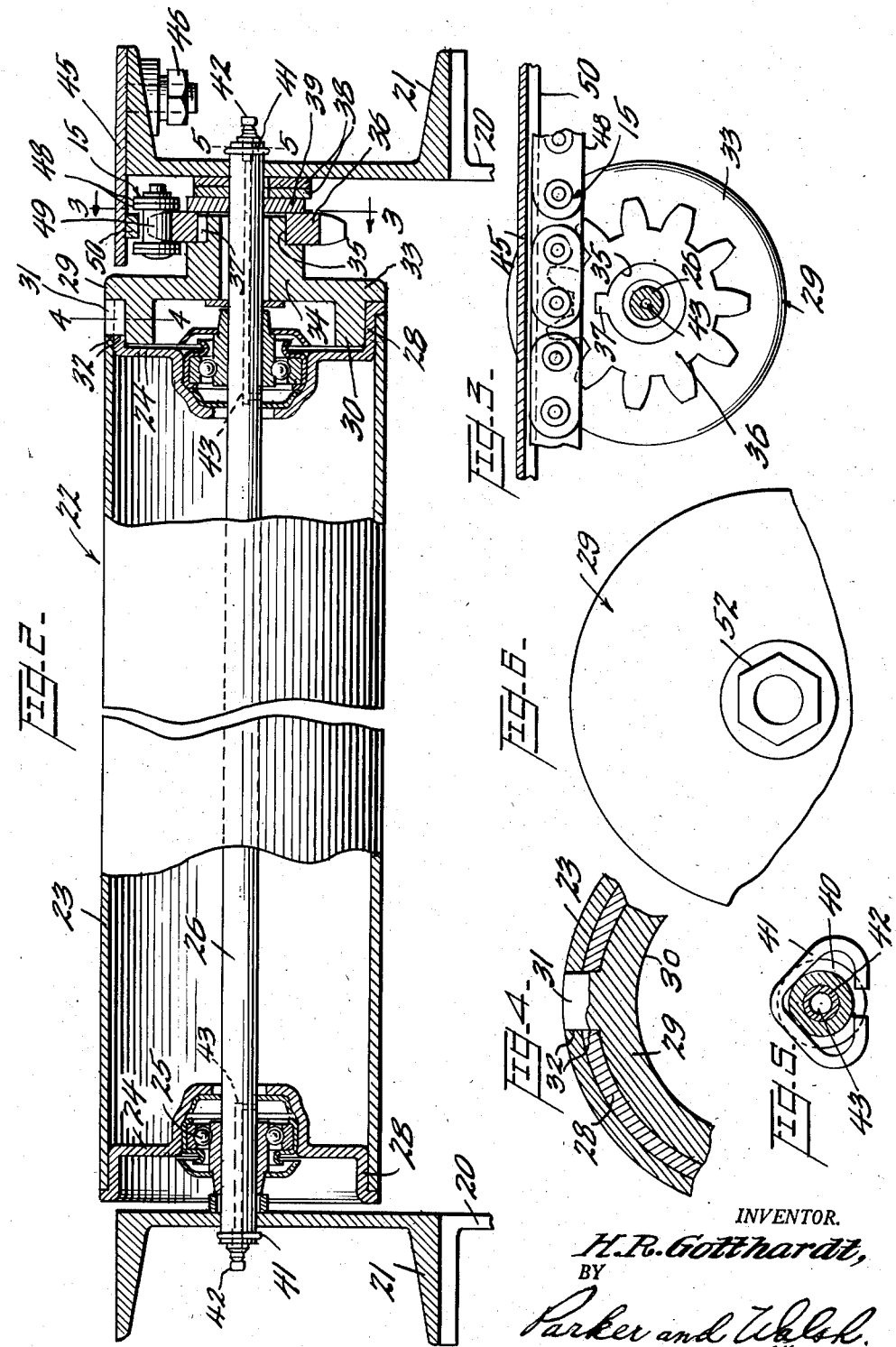

Patented Sept. 9, 1952

2,609,917

UNITED STATES PATENT OFFICE 2,609,917

POWER DRIVEN ROLLER CONVEYER

Henry R. Gotthardt, Louisville, Ky., assignor to Logan Co., Inc., Louisville, Ky., a corporation of Kentucky Application September 20, 1950, Serial No. 185,876

14 Claims. (Cl. 198—127)

This invention relates to power driven roller conveyors.

Numerous types of conveyors have been provided in the past wherein packages or the like are supported by positively driven rollers. Apparatus of this character has proven practicable, but they involve certain disadvantages in use. For example, the driving of certain types of live rollers in the past has been accomplished by means which limits the close spacing of the rollers, thus rendering it impracticable to move small articles thereover. Moreover, in such types of apparatus, where a break-down of a roller or associated parts occurs, it is extremely difficult to disassemble a roller unit for the purpose of replacing broken or worn parts.

Many of the earlier types of power driven roller conveyors derive their power through belts or chains operating over pulleys or sprockets connected to the rollers, and the endless drive means frequently are exposed. This forms a source of serious danger of injury to workmen placing articles on the conveyors, the workmen usually wearing gloves which sometimes fit loosely and become entangled in the roller driving means and thus causing serious injuries.

An important object of the present invention is to provide a power driven roller conveyor, which may be either stationary or portable, and wherein the driving means employed permits the load-supporting rollers to be closely arranged, thus rendering the conveyor practicable for conveying small articles or packages.

A further object is to provide such a conveyor wherein the endless driving means is in the form of a chain and wherein novel means is employed for maintaining the chain in driving engagement with each roller sprocket without the use of idlers, thus permitting the rollers to be arranged in close proximity to each other.

A further object is to provide a novel assembly of elements in a conveyor of this character which permits each roller to be quickly and easily dismantled for repairs, thus preventing lengthy tie-ups while repairs are being made, this being a matter of great importance in many installations wherein continuous operation of the conveyor is essential.

A further object is to provide as a single unit the means which maintains the chain in driving engagement with the roller sprockets and means for guarding the chain and sprockets to prevent the hands or gloves of workers from becoming entangled with the driving means.

A further object is to provide a novel guard plate which covers the driving chain and sprockets and which serves to maintain the chain in driving engagement with the sprockets and to assist in guiding the chain to prevent its jumping off any of the sprockets.

A further object is to provide a novel mounting of the sprocket with respect to each roller and its associated bearing means whereby the parts may be readily and quickly disassembled for the purpose of making repairs of any kind.

Other objects and advantages of the present invention will become apparent during the course of the following description.

In the drawings, I have shown one general embodiment of the invention. In this showing, Figure 1 is a side elevation of a conveyor section embodying the present invention, parts being broken away, Figure 2 is an enlarged transverse section on line 2—2 of Figure 1, parts being broken away and parts being shown in elevation, Figure 3 is a detail section on line 3—3 of Figure 2, Figure 4 is a fragmentary detail section on line 4—4 of Figure 2, Figure 5 is a detail section on line 5—5 of Figure 2, and Figure 6 is a fragmentary face view of a modified type of sprocket supporting hub.

Referring to Figures 1 and 2, in which is illustrated a single conveyor section embodying the present invention, the numeral 10 designates a suitable base on which is mounted a motor 11 operative through a suitable conventional gear reducer 12 for driving a shaft 13 on which is mounted a sprocket 14. A chain 15 passes around the sprocket 14 and around idler sprockets 16, suitably supported for rotation by the housing of the gear reducer 12 by bearings (not shown).

A plurality of legs or standards 20 are fixed at their lower ends to the base 10 and support at their upper ends a pair of conveyor side rails 21, preferably of channel section as shown in Figure 2. In a manner to be described, the side rails 21 support a plurality of conveyor roller units each indicated as a whole by the numeral 22.

Each roller unit comprises a tube 23 forming the roller body in each end of which is seated a cup 24 housing a bearing structure 25 surrounding a shaft 26 which has its ends projecting through similarly shaped openings in the side rails 21. Except with respect to one of the cups 24, as referred to above, the roller 23, cup 24, bearings 25 and shaft 26 are of conventional construction.

Each cup 24 has formed as a part thereof a cylindrical flange 28. At one end of each roller is arranged a hub 29 having an inwardly extending cylindrical flange 30 having a light press fit in the flange 28 of the associated cup 24. At one side, the hub 29 carries an integral lug 31 (Figures 2 and 4) fitting in recesses 32 cut in the adjacent ends of the roller 23 and flange 28. This lug locks together for rotation the hub 29, roller 23 and the adjacent cup 24 to afford a positive drive connection which permits the use of a light press fit of the flanges 28 and 30 at the right hand side of Figure 2, and such fit facilitates the disassembling of the parts for repairs or replacement. The hub 29 is provided with a disc portion 33 from one face of which the flange 30 extends. From the opposite side of the disc portion 33, the hub 29 is provided with a central axially projecting portion 34 loosely surrounding the shaft 26. The projecting portion 34 is reduced at its outer end as at 35 to be received in a sprocket 36 which may be keyed to the hub 29 as at 37. It will be apparent from Figures 1 and 2 that the chain 15 passes over the tops of and engages the teeth of all of the sprockets 36, thus providing means for driving the conveyor rolls. Adjacent the outer face of the sprocket 36 is arranged a bronze washer 39, and between this washer and the side rail may be arranged a pair of flat washers 38.

The shaft 26 is slidable through its openings in the rails 21, and adjacent each end, the shaft is annularly grooved as at 40 (Figure 5) for reception of a snap ring 41 for preventing substantial endwise movement of the shaft. The bearing structure 25 at each end of the shaft may be lubricated through a conventional fitting 42, lubricant being forced through a passage 43 in each end of the shaft, in accordance with conventional practice.

The rigid guard plate 45 is arranged over the top flange of the rail 21 adjacent the sprockets 36. Bolts 46 secure the guard plate 45 to the associated rail 21, and the plate 45 projects horizontally over the upper run of the chain 15 to a point adjacent the hubs 29, as shown in Figure 2. The chains employed preferably are of the type including side links 48 connected by rollers 49, the tops of which in the upper run of the chain are below the top edges of the links 48, thus forming in effect a channel within which lies a guide strip 50 carried by and depending from the guard plate 45.

The keying of the sprockets 36 to the hubs as at 37 is satisfactory for most innstallations. In some cases, however, it is desired that the reduced portion 35 of each hub be formed polygonal, and preferably hexagonal as shown in Figure 6 and indicated by the numeral 52. In such case, each sprocket 36 will be provided with a correspondingly shaped opening.

Operation

The chain 15 is driven by the power source 11 and speed reducer 12 in a manner which will be obvious. The upper run of the chain travels over the tops of the sprockets 36 and imparts positive rotational movement thereto. The guard plate 45 prevents the upper run of the chain from jumping from the roller sprockets and the strip 50 assists in guiding the chain, as well be apparent. The chain accordingly is maintained in positive driving engagement with each roller, and since it occupies no space between the rollers and does not require the use of idler sprockets for maintaining the driving connection, the rollers 23 may be made as close together on centers as their diameters will permit.

As previously stated, exposed drive chains and belts in a device of this character constitute a source of danger of injury to workmen placing packages on the conveyor. Any such injury is prevented by the complete covering of the drive chain and sprockets by the plate 45. This plate, therefore, constitutes a single means for accomplishing two highly desirable results, namely, maintaining the driving connection between the upper run of the chain and the sprockets 36, and protecting workmen from possible injury.

As previously stated, the engaging flanges 30 and 28 have a light press fit with each other and are easily disengaged. While the parts are assembled, the hub 29 cannot partake of movement longitudinally of the shaft 26 since the hub is fitted against the roller at one side while the sprocket 35, engaging the washer 39, prevents movement of the hub 29 in the opposite direction. At the same time, the lug 31 forms a positive driving connection with the roller 23 and cup 24.

When it is desired to replace a part of a roller unit or to gain access to any part for any reason, the snap ring 41 at the right hand side of the apparatus as viewed in Figure 2 can be removed and the shaft 26 slid axially to the left. As soon as the shaft has been axially moved a sufficient distance, the washers 38 and 39 will drop out, whereupon the operator may slide the sprocket 36 axially to remove it from the hub 29. The play between the shaft 26 and its opening in the opposite rail 21 is sufficient to permit the right hand end of the roller in Figure 2 to be lowered far enough to slide the hub 21 from the operative position, the shaft 26 at this time being slid inwardly a sufficient distance to permit this operation to take place. Obviously any other elements of the apparatus may be rendered accessible for repair, inspection, replacement, etc.

The provision of the guard plate 45 not only protects workmen from injury, but also maintains the driving connection between the chain and roller sprockets, as stated. The plate 45 forms a highly economical means for performing both results, and in particular, its cost of manufacture and installation is much less than conventional means employed for maintaining the driving connection referred to. The structure is, therefore, economical to manufacture and install and easy to assemble and disassemble.

Obviously, the connecting means between the sprocket and hub as illustrated in Figure 6 is fully the equivalent of the key means shown in Figure 2. In Figure 6, the interengaging parts are polygonal and the sprocket may be withdrawn when desired as easily as the sprocket in Figure 2.

I claim:

1. A conveyor comprising a plurality of rollers, parallel side frame members supporting said rollers for rotation, sprockets connected to said rollers and lying in a common plane, a chain extending over and engaging all of said sprockets to drive said rollers, a plate carried by one of said side frame members adjacent said chain and extending thereover to act as a guard therefor, said plate being arranged in proximity to said chain, normally out of engagement therewith, to prevent disengagement of said chain from said sprockets, and a depending longitudinally extending guide carried by said plate normally out of engagement with said chain but arranged in proximity thereto to prevent lateral movement of said chain relative to said sprockets.

2. A conveyor comprising a plurality of conveyor rollers, a shaft projecting through each roller, a pair of outwardly opening parallel side frame members carrying the ends of said shafts to support said rollers for rotation, a hub for one end of each roller, the end of each shaft opposite said hub being slidable in its associated side frame member, each hub having a portion projecting into the end of its associated roller and lightly engaging such roller to be endwise removable therefrom, means interengaging between each roller and its associated hub to provide a positive rotational driving connection therebetween, a sprocket carried by each hub, a chain extending over and engaging said sprockets to drive said rollers, and means carried by the frame member adjacent said chain and extending over said chain to act as a guard therefor and being arranged in proximity to said chain to prevent disengagement thereof from said sprockets.

3. A conveyor comprising a plurality of conveyor rollers, a shaft projecting through each roller, a pair of outwardly opening parallel side frame members carrying the ends of said shafts to support said rollers for rotation, a hub for one end of each roller, the end of each shaft opposite said hub being slidable in its associated side frame member, each hub having a portion projecting into the end of its associated roller and lightly engaging such roller to be endwise removable therefrom, the end of each roller adjacent its associated hub having a slot and such hub having a lug engaging said slot providing a positive driving connection between each hub and its associated roller, a sprocket carried by each hub, a chain extending over and engaging said sprockets to drive said rollers, and means carried by the frame member adjacent said chain and extending over said chain to act as a guard therefor and being arranged in proximity to said chain to prevent disengagement thereof from said sprockets.

4. A conveyor comprising a plurality of conveyor rollers, a shaft projecting through each roller, a pair of outwardly opening parallel side frame members carrying the ends of said shafts to support said rollers for rotation, a hub for one end of each roller, the end of each shaft opposite said hub being slidable in its associated side frame member, each hub having a portion projecting into the end of its associated roller and lightly engaging such roller to be endwise removable therefrom, means interengaging between each roller and its associated hub to provide a positive rotational driving connection therebetween, a sprocket carried by each hub, a chain extending over and engaging said sprockets to drive said rollers, and a plate extending longitudinally of and fixed to one of said side frame members and projecting over said chain throughout the length of engagement thereof with said sprockets to act as a guard for said chain and said sprockets, said plate being normally out of engagement with but in close proximity to said chain to prevent the latter from becoming disengaged from said sprockets.

5. A conveyor comprising a plurality of conveyor rollers, a shaft projecting through each roller, a pair of outwardly opening parallel side frame members carrying the ends of said shafts to support said rollers for rotation, a hub for one end of each roller, the end of each shaft opposite said hub being slidable in its associated side frame member, each hub having a portion projecting into the end of its associated roller and lightly engaging such roller to be endwise removable therefrom, the end of each roller adjacent its associated hub having a slot and such hub having a lug engaging said slot providing a positive driving connection between each hub and its associated roller, a sprocket carried by each hub, a chain extending over and engaging said sprockets to drive said rollers, and a plate extending longitudinally of and fixed to one of said side frame members and projecting over said chain throughout the length of engagement thereof with said sprockets to act as a guard for said chain and said sprockets, said plate being normally out of engagement with but in close proximity to said chain to prevent the latter from becoming disengaged from said sprockets.

6. A conveyor comprising a plurality of conveyor rollers, a shaft projecting through each roller, a pair of outwardly opening parallel side frame members carrying the ends of said shafts to support said rollers for rotation, a hub for one end of each roller, the end of each shaft opposite said hub being slidable in its associated side frame member, each hub having a portion projecting into the end of its associated roller and lightly engaging such roller to be endwise removable therefrom, means interengaging between each roller and its associated hub to provide a positive rotational driving connection therebetween, a sprocket carried by each hub, a chain extending over and engaging said sprockets to drive said rollers, said chain comprising side links, and rollers connecting said links and of a diameter less than the width of said links whereby a channel is formed in the top of said chain as the latter travels over said sprockets, a plate extending longitudinally over and fixed to the side frame member adjacent said chain and projecting over said chain in proximity thereto, and a rib carried by and depending from said plate and extending longitudinally over said channel, said plate and said rib being normally out of contact with but in close proximity to said chain respectively to prevent movement of said chain from said sprockets and movement of said chain laterally with respect to said sprockets.

7. A conveyor comprising a plurality of conveyor rollers, a shaft projecting through each roller, a pair of outwardly opening parallel side frame members carrying the ends of said shafts to support said rollers for rotation, a hub for one end of each roller, the end of each shaft opposite said hub being slidable in its associated side frame member, each hub having a portion projecting into the end of its associated roller and lightly engaging such roller to be endwise removable therefrom, the end of each roller adjacent its associated hub having a slot and such hub having a lug engaging said slot providing a positive driving connection between each hub and its associated roller, a sprocket carried by each hub, a chain extending over and engaging said sprockets to drive said rollers, said chain comprising side links, and rollers connecting said links and of a diameter less than the width of said links whereby a channel is formed in the top of said chain as the latter travels over said sprockets, a plate extending longitudinally over and fixed to the side frame member adjacent said chain and projecting over said chain in proximity thereto, and a rib carried by and depending from said plate and extending longitudinally over said channel, said plate and said rib being normally out of contact with but in close proximity to said chain respectively to prevent movement of said chain from said sprockets and movement of said chain laterally with respect to said sprockets.

8. A conveyor comprising a plurality of tubular rollers, a shaft projecting through each roller, a pair of outwardly opening parallel side frames supporting the ends of said shafts, a bearing structure in each end of each roller to support each roller for rotation relative to its associated shaft, the bearing structure in one end of each roller comprising an outer cup relatively loosely projecting into such roller to be endwise removable therefrom, a hub at said end of each roller comprising a cylindrical flange slidably received in the cup of the associated bearing structure to be endwise removable therefrom, the other end of each shaft being slidable in the adjacent side frame, said cup and said end of each roller having aligned slots therethrough and the associated hub having a lug engaging in both of said slots whereby each sprocket and its associated roller and cup are fixed for rotation as a unit, and means between said ends of said roller and the adjacent side frame member for driving said hubs.

9. A conveyor comprising a plurality of tubular rollers, a shaft projecting through each roller, a pair of outwardly opening parallel side frames supporting the ends of said shafts, a bearing structure in each end of each roller to support each roller for rotation relative to its associated shaft, the bearing structure in one end of each roller comprising an outer cup relatively loosely projecting into such roller to be endwise removable therefrom, a hub at said end of each roller comprising a cylindrical flange slidably received in the cup of the associated bearing structure to be endwise removable therefrom, the other end of each shaft being slidable in the adjacent side frame, said cup and said end of each roller having aligned slots therethrough and the associated hub having a lug engaging in both of said slots whereby each sprocket and its associated roller and cup are fixed for rotation as a unit, a sprocket carried by each hub and fixed against rotation relative thereto, and a chain engaging said sprockets to drive them.

10. A conveyor comprising a plurality of tubular rollers, a shaft projecting through each roller, a pair of outwardly opening parallel side frames supporting the ends of said shafts, a bearing structure in each end of each roller to support each roller for rotation relative to its associated shaft, the bearing structure in one end of each roller comprising an outer cup relatively loosely projecting into such roller to be endwise removable therefrom, a hub at said end of each roller comprising a cylindrical flange slidably received in the cup of the associated bearing structure to be endwise removable therefrom, the other end of each shaft being slidable in the adjacent side frame, said cup and said end of each roller having aligned slots therethrough and the associated hub having a lug engaging in both of said slots whereby each sprocket and its associated roller and cup are fixed for rotation as a unit, each hub having a reduced non-circular portion projecting toward the adjacent side frame member, a sprocket fitting and slidable on the reduced portion of each hub, and a chain engaging said sprockets to drive them.

11. A conveyor comprising a plurality of tubular rollers, a shaft projecting through each roller, a pair of outwardly opening parallel side frames supporting the ends of said shafts, a bearing structure in each end of each roller to support each roller for rotation relative to its associated shaft, the bearing structure in one end of each roller comprising an outer cup relatively loosely projecting into such roller to be endwise removable therefrom, a hub at said end of each roller comprising a cylindrical flange slidably received in the cup of the associated bearing structure to be endwise removable therefrom, the other end of each shaft being slidable in the adjacent side frame, said cup and said end of each roller having aligned slots therethrough and the associated hub having a lug engaging in both of said slots whereby each sprocket and its associated roller and cup are fixed for rotation as a unit, each hub having a reduced non-circular portion projecting toward the adjacent side frame member, a sprocket fitting and slidable on the reduced portion of each hub, a chain extending over and engaging said sprockets, and an elongated plate fixed to said side frame adjacent said chain and extending over said chain in close proximity thereto to act as a guard therefor and to prevent disengagement of said chain from said sprockets.

12. A conveyor constructed in accordance with claim 11 wherein said chain comprises side links, and rollers connecting such links and of a diameter less than the width of said links to define a channel along the top of said chain, said plate having a depending rib projecting into said channel, normally out of contact with said chain, to prevent lateral movement of said chain relative to said sprockets.

13. In a conveyor, a tubular roller, a shaft projecting through said roller, a bearing structure in each end of said roller to support it for rotation relative to said shaft, the bearing structure in one end of said roller comprising an outer cup relatively loosely projecting into the adjacent end of said roller to be endwise removable therefrom, a hub at said end of said roller comprising a cylindrical flange slidably received in said cup to be endwise removable therefrom, means cooperating between said roller and said cup and said hub for fixing said cup and said hub against rotation relative to said roller, and means for rotating said hub.

14. In a conveyor, a tubular roller, a shaft projecting through said roller, a bearing structure in each end of said roller to support it for rotation relative to said shaft, the bearing structure in one end of said roller comprising an outer cup relatively loosely projecting into the adjacent end of said roller to be endwise removable therefrom, a hub at said end of said roller comprising a cylindrical flange slidably received in said cup to be endwise removable therefrom, means cooperating between said roller and said cup and said hub for fixing said cup and said hub against rotation relative to said roller, means for rotating said hub, and means slidably surrounding said shaft outwardly of said hub and engageable with said hub to prevent movement thereof endwise of said shaft out of said cup.

HENRY R. GOTTHARDT.

REFERENCES CITED

The following references are of record in the file of this patent:

UNITED STATES PATENTS

| Number | Name | Date |
|---|---|---|
| 1,896,150 | Zademach | Feb. 7, 1933 |
| 2,074,901 | Gotthardt et al. | Mar. 23, 1937 |

FOREIGN PATENTS

| Number | Country | Date |
|---|---|---|
| 377,119 | Great Britain | July 21, 1932 |